(12) United States Patent
Sasaki et al.

(10) Patent No.: US 6,675,491 B2
(45) Date of Patent: Jan. 13, 2004

(54) SCALE ON AN APPARATUS FOR MEASURING DISPLACEMENT

(75) Inventors: Kouji Sasaki, Kawasaki (JP);
Yoshikazu Ooyama, Utsunomiya (JP);
Hiroshi Koizumi, Utsunomiya (JP);
Nobuyuki Shinpou, Utsunomiya (JP);
Seigo Takahashi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/126,686

(22) Filed: Apr. 22, 2002

(65) Prior Publication Data

US 2002/0152626 A1 Oct. 24, 2002

(30) Foreign Application Priority Data

Apr. 20, 2001 (JP) ........................................ 2001-123303

(51) Int. Cl.[7] ................................................ G01B 21/16
(52) U.S. Cl. ...................... 33/706; 33/708; 324/207.24
(58) Field of Search ........................ 33/706, 707, 708; 324/207.24, 207.17, 207.22

(56) References Cited

U.S. PATENT DOCUMENTS

| 5,635,833 | A | * | 6/1997 | Onodera et al. | ........ 324/207.22 |
| 5,973,494 | A | | 10/1999 | Masreliez et al. | ..... 324/207.24 |
| 6,154,974 | A | * | 12/2000 | Nakajima et al. | ............. 33/707 |
| 6,442,861 | B1 | * | 9/2002 | Boge et al. | ................... 33/706 |

* cited by examiner

*Primary Examiner*—Christopher W. Fulton
(74) *Attorney, Agent, or Firm*—Westerman, Hattori, Daniels & Adrian, LLP

(57) ABSTRACT

A scale for an apparatus for measuring displacement is enclosed. It comprises a scale member having a plurality of rectangular gratings arranged in a periodic pattern on the glass epoxy substrate and the like, a coating layer covered on the side of the scale member on which a plural of the rectangular gratings are formed, a scale cover (film layer) which functions as a protective layer, and a scale forming material bonded to the outer portion of the coating layer by an adhesive layer so as to keep contaminants, oil or particles from intruding between the rectangular grating and the adhesive layer, for example an adhesive tape and the like.

15 Claims, 2 Drawing Sheets

SCALE ON AN APPARATUS FOR MEASURING DISPLACEMENT

BACKGROUND OF THE INVENTION

1. Field of the Invention

This invention relates to a scale on an apparatus for measuring displacement and more particularly to a scale providing a high environmental resistance on an apparatus for measuring displacement.

2. Related Art of the Invention

A scale on an apparatus for measuring displacement, for example, an electronic caliper disclosed in U.S. Pat. No. 5,973,494 to Karl G. Mareliez et al, is bonded to the top surface of a slider's beam assembly (denoted as P in FIG. 3A, showing the present invention). Such a the scale includes generally an elongated printed circuit board. A plurality of rectangular gratings 12 are spaced apart along the printed circuit board in an aperiodic pattern on a glass-epoxy substrate 11. The scale includes also a scale cover 30 which is deposited onto the top surface of a plural of rectangular gratings 12 by for example an adhesive tape or the like. The scale cover 30 serves as a protector for the adhesive layer 20. The protector 30 can also include a printed marking.

In such a conventional scale used for an apparatus for measuring displacement, since the top surface side of the scale substrate 11 is formed with raised portions by bonding the rectangular grating 12 thereon, it provides an imperfect contact with the scale cover 30. Consequently contaminated coolant and oil can find their way between the scale member 10 and the scale cover 30 and intrude into the gap therebetween and then the scale cover 30 is easily peeled from the adhesive layer 20. Thereby contaminated coolant and oil cause measurement errors.

Furthermore when such a is scale used in a conventional shop, coolant and oil may potentially intrude into the gap between the scale member 10 and the scale cover 30. In some types of oil and non-water-solvent coolants, chlorine and sulfur may cause chemical reaction with the rectangular grating 12 made from copper to make them corroded, to disrupt the rectangular grating 12 and to result in detection error.

This invention has been made in view of the above-described state of the related art, and has for its object to provide a scale for measuring displacement having a significant resistance to the environment such that it provides great reliability in a harmful industrial environment.

BRIEF DESCRIPTION OF THE DRAWINGS

The preferred embodiments of the invention will be described in detail with reference to the following figures, wherein.

DESCRIPTION OF THE INVENTION

In one aspect of the present invention, a scale for an apparatus for measuring displacement is provided. The scale comprises a scale member including a plurality of the rectangular grating formed on a top surface of the scale substrate, a coating layer covering the side on which the rectangular grating is formed, and a scale cover covering with a bonding layer the coating layer which covers the rectangular grating formed on the scale substrate.

According to the present invention, since the coating layer is covered at least on the side of the scale substrate on which the rectangular grating are formed, it prevents coolant and oil and the like from intruding into a gap between the scale electrode and the scale member. As result, the scale of the present invention can sufficiently provide reliability on an apparatus for measuring distance no matter how it is used in a harmful contaminant-filled environment.

Material having a high solvent resistance, such as polyimid and epoxy coating material and the like, is suitable for the coating layer. It is desirable that the portion of the coating layer contacting the scale cover be cleaned and activated by plasma radiation so as to enhance adhesiveness between the coating layer and the scale cover. A material which can be coated at low temperature, for example, an ultraviolet hardening agent, is desirably used for the coating layer such that the rectangular grating can be prevented from deforming. If the scale member is entirely surrounded with the coating layer, a higher protection from contaminants is further provided.

Figure 1:
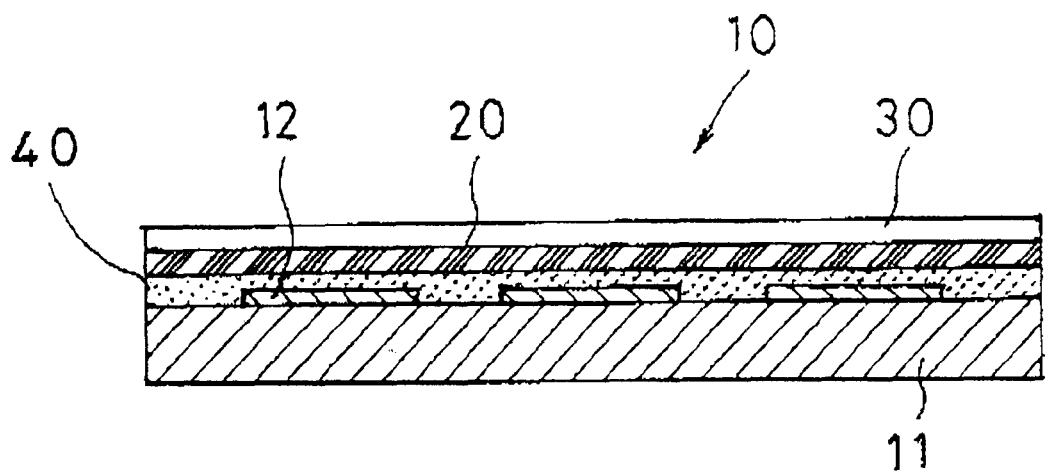
FIG. 1 is a cross sectional view of a scale having a plurality of rectangular gratings on an apparatus for measuring displacement, in a first embodiment.

Referring to the figures, the preferred embodiment of the present invention will be explained next. FIG. 1 shows a cross sectional view representative of a scale on an apparatus for measuring displacement of the first embodiment. The scale comprises a scale member 10 having a plurality of rectangular gratings arranged with a periodic pattern on the glass epoxy substrate 11 and the like, a coating layer 40 covered on the side of the scale member 10 which a plurality of rectangular gratings 12, a scale cover (film layer) 30 which functions as a protective layer, and a scale forming material bonded to the outer portion of the coating layer 40 an adhesive layer 20 so as to keep contaminant or oil from intruding between the rectangular grating 12 and the adhesive layer 20 being for example an adhesive tape and the like.

The scale comprises the coating layer 40 cleaned, activated and made rough by radiating plasma after it is coated on the side of the scale on which the rectangular grating 12 are deposited. Further bonding the coating layer to the scale cover 30 enhances adhesive strength between the scale cover 30 the coating layers 40, and prevent the scale cover 30 from be peeled. It also provides smooth flatness on the surface of the scale member 10.

Polyimid and other epoxy based material having a high solvent resistance is suitable for the material for coating layer 40. If coating work is performed at high temperature, the rectangular grating are potentially deformed (elongation) and acquire an accuracy error. In order to solve such a problem, UV coating layer 40 such as UV ink for a screen-typed printing machine, for example "SEIKA BEAM" manufactured by DAINICHI SEIKA KOUGYO and the like, may be also used.

Figure 2:
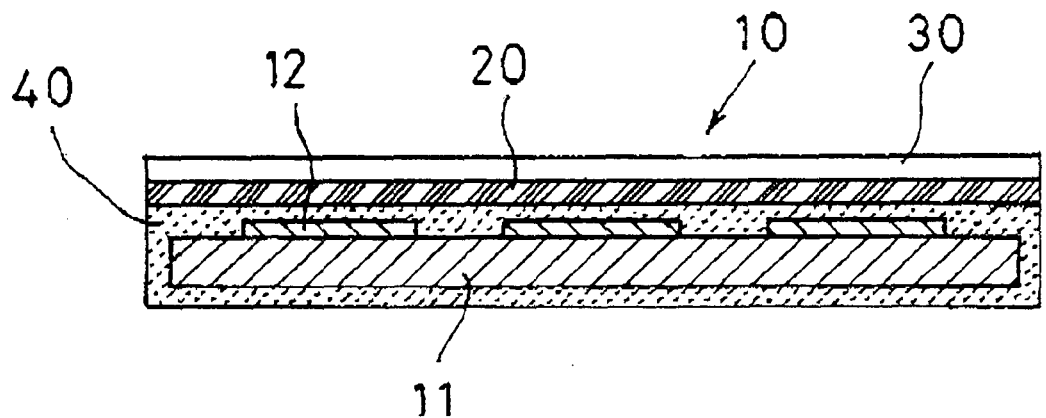
FIG. 2 is a cross sectional view of a scale having a plurality of rectangular gratings on an apparatus for measuring displacement, in a second embodiment.
Figure 4:
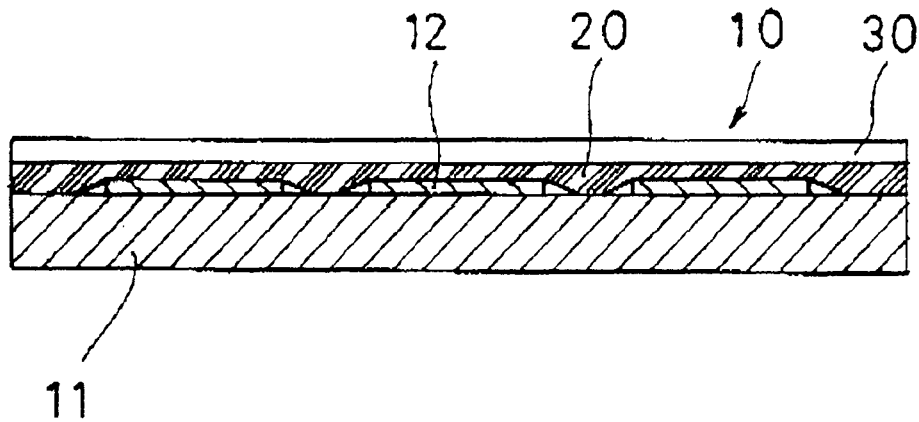
FIG. 4 is a cross sectional view of a scale on an apparatus for measuring displacement of the related art.

FIG. 2 shows a cross sectional view representative of a scale of an apparatus for measuring displacement of the second embodiment. This embodiment shows that the coating layer 40 covers not only the side of the scale member 10 on which rectangular grating 12 is deposited, but also the reverse side of it. In this case, in order to obtain a high adhesion upon bonding, the scale cover 30 is is desirably bonded on the adhesive layer 20 after the reverse side of the rectangular grating 12 is plasma irradiated for a rough surface thereon.

As described above, since the coating layer covers not only on the side of the scale member 10 on which the rectangular grating 12 are deposited, but also entirely surrounds the scale member including the electrodes and the scale substrate, it prevent a harmful contaminant or oil from intruding between the rectangular grating 12 and the adhesive layer 20.As a result, the present invention brings a great advantage that provides reliability of a scale of an apparatus for measuring displacement even when operating in a harmful environment contaminated by coolant and the like.

In an apparatus for measuring displacement, the rectangular grating is composed of signal transferring portions and signal non-transferring portions which are arranged at a predetermined pitch.

Figure 3A:
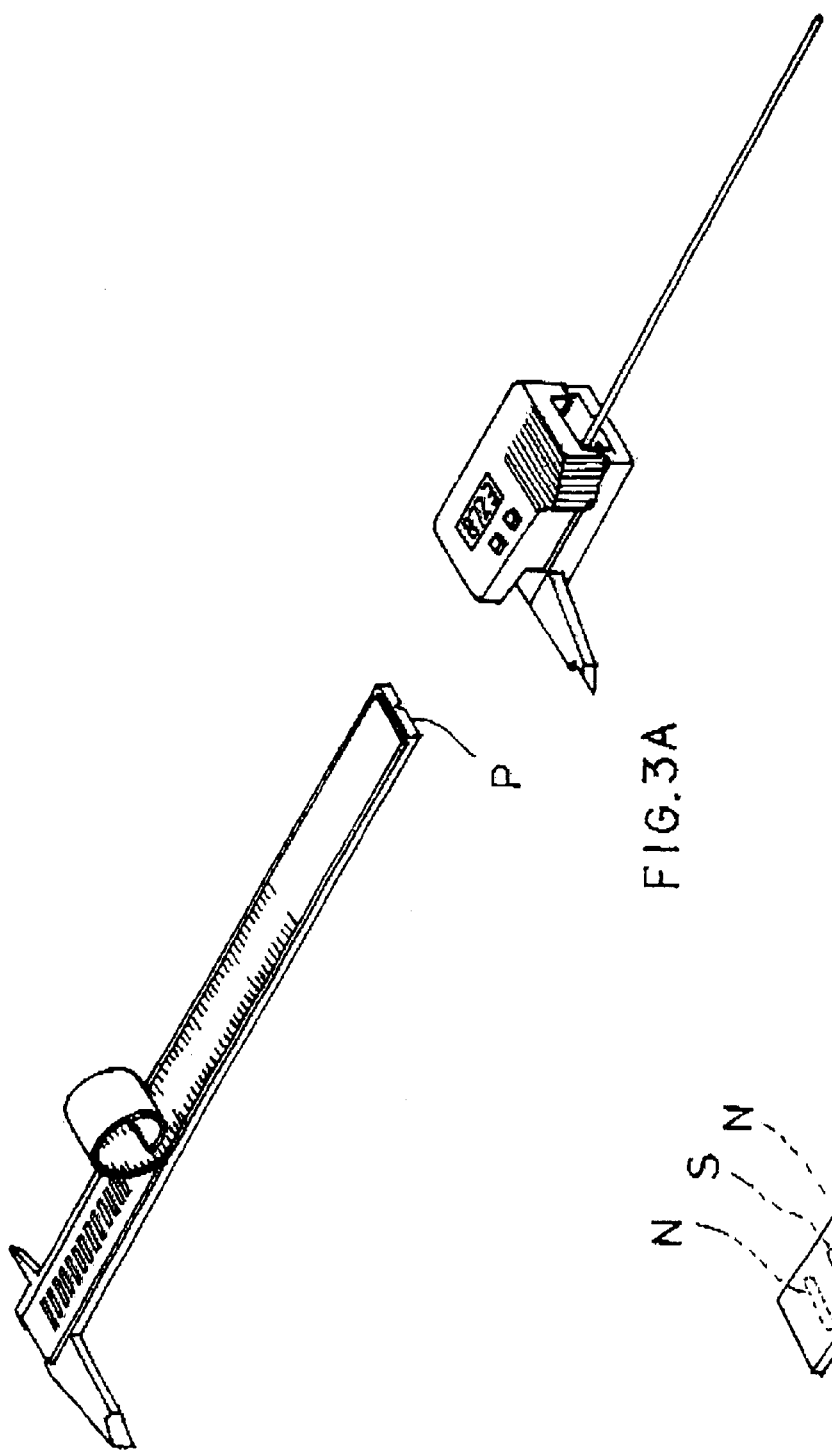
FIG. 3A is a schematic view of a scale of an electrostatic capacitance-type encoder and an optical-type encoder on an apparatus for measuring displacement of the present invention.
Figure 3B:
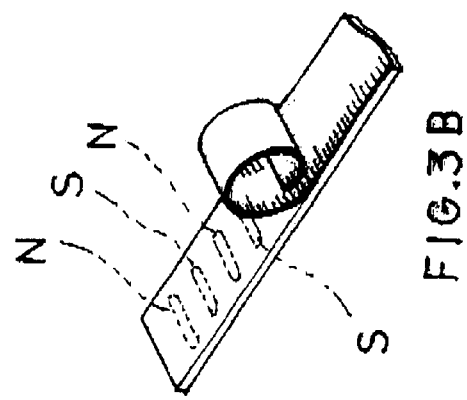
FIG. 3B is a schematic view of a scale of a magnetic-type encoder on apparatus for measuring displacement of the present invention.

In the encoder used for a capacitance type apparatus for measuring displacement, the signal transferring portion is electric signal transferring portion that uses capacitance coupling (FIG. 3A). In the encoder used for an optical type apparatus for measuring displacement, the signal transferring portion transmits or reflects on an optical encoder (FIG. 3A). In the encoder for a magnetic measuring displacement, the signal transferring portion is a magnetic signal transferring portion that uses magnetic coupling (FIG. 3B).

While aspects of the present invention have been particularly shown and described with reference to the preferred embodiment above, it will be understood by those skilled in the art that various additional embodiments may be contemplated without departing from the spirit and scope of the present invention.

What is claimed is:

1. A scale for an apparatus for measuring a displacement, the scale comprising:
   a scale member including a plurality of gratings formed above and in contact with a top surface of the scale substrate,
   a coating layer covering the side on which said grating are formed, and
   a scale cover covering, with a bonding layer on said coating layer, which covers said grating formed on said substrate.

2. The scale for measuring a displacement according to claim 1, wherein said coating layer comprises polyimid and/or epoxy.

3. The scale for measuring a displacement according to claim 1, wherein said coating layer comprises an ultraviolet hardening agent.

4. The scale for measuring a displacement according to claim 1, wherein said grating comprises signal transferring portions and signal non-transferring portions.

5. The scale for measuring a displacement according to claim 4, wherein the entire scale transmits signals.

6. The scale for measuring a displacement according to claim 1, wherein said grating comprises a magnetic signal transferring portions and magnetic signal non-transferring portions.

7. The scale for measuring a displacement according to claim 1, wherein said grating comprises light transmitting portions and light non-transmitting portions.

8. The scale for measuring a displacement according to claim 7, wherein the entire scale transmits signals.

9. The scale for measuring a displacement according to claim 1, wherein said coating layer comprises a signal transferring layer.

10. The scale for measuring a displacement according to claim 1, wherein said coating layer is radiated by plasma to roughen a surface of the coating layer facing the scale cover.

11. The scale for measuring a displacement according to claim 1, wherein said coating layer entirely surrounds the scale substrate.

12. The scale for measuring a displacement according to claim 1, wherein the plurality of gratings are arranged with a periodic pattern on the substrate.

13. The scale for measuring a displacement according to claim 1, wherein the gratings are rectangular.

14. A scale, on apparatus for measuring a displacement, comprising:
   a scale member including a plurality of gratings formed at least on the top surface of the scale substrate, a coating layer covering the side on which said grating are formed and a scale cover covering with a bonding layer on said coating layer which covers on said grating formed on said substrate;
   wherein said coating layer is radiated by plasma to its facing surface to the scale cover for a rough surface thereon.

15. A scale, on apparatus for measuring a displacement, comprising:
   a scale member including a plurality of gratings formed at least on the top surface of the scale substrate, a coating layer covering the side on which said grating are formed, and a scale cover covering with a bonding layer on said coating layer which covers on said grating formed on said substrate;
   wherein said coating layer entirely surrounds the scale substrate.

* * * * *